United States Patent [19]

Siegfried, II

[11] Patent Number: 4,928,758
[45] Date of Patent: May 29, 1990

[54] DOWNHOLE WELLBORE FLOWMETER TOOL

[75] Inventor: Robert W. Siegfried, II, Richardson, Tex.

[73] Assignee: Atlantic Richfield Company, Los Angeles, Calif.

[21] Appl. No.: 418,507

[22] Filed: Oct. 10, 1989

[51] Int. Cl.$^5$ .............................................. E21B 47/00
[52] U.S. Cl. ...................................... 166/66; 166/250; 73/155
[58] Field of Search ................... 166/64, 65.1, 66, 101, 166/113, 250; 73/155, 861.77, 861.87, 81.88

[56] References Cited

U.S. PATENT DOCUMENTS

| | | | |
|---|---|---|---|
| 2,143,962 | 1/1939 | Stone | 166/64 |
| 2,379,138 | 6/1945 | Fitting, Jr. et al. | 166/66 |
| 4,435,978 | 3/1984 | Glatz | 166/250 |
| 4,787,446 | 11/1988 | Howell et al. | 166/66.4 |

OTHER PUBLICATIONS

Piers et al. "A New Flowmeter for Production Logging and Well Testing", SPE 16819, Sep. 1987.
Wade et al. "Production Logging-the key to Optimum Well Performance", JPT, pp. 137–164, Feb. 1965.

Primary Examiner—Bruce M. Kisliuk
Attorney, Agent, or Firm—Drude Faulconer

[57] ABSTRACT

A downhole flowmeter tool adapted to be lowered into a wellbore and expanded to provide a restricted flow annulus around the tool. One or more flow-sensing means are positioned within the annulus to measure flow therethrough.

11 Claims, 2 Drawing Sheets

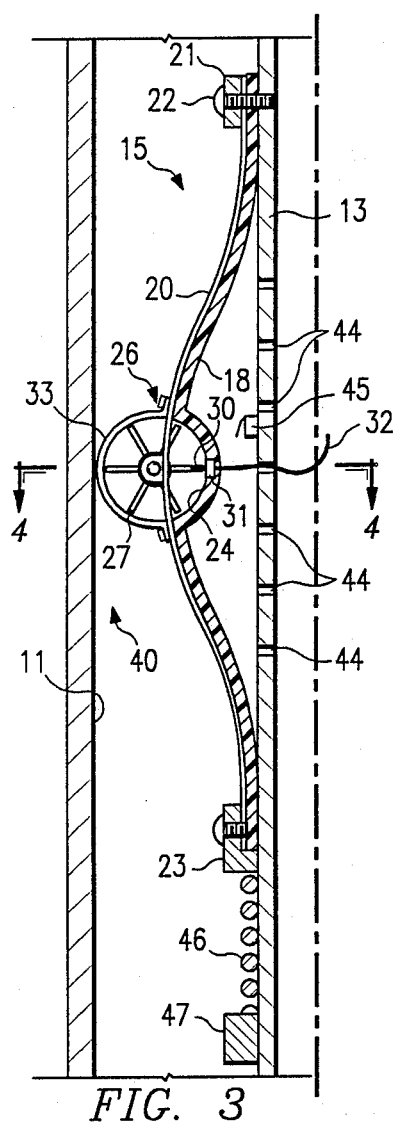
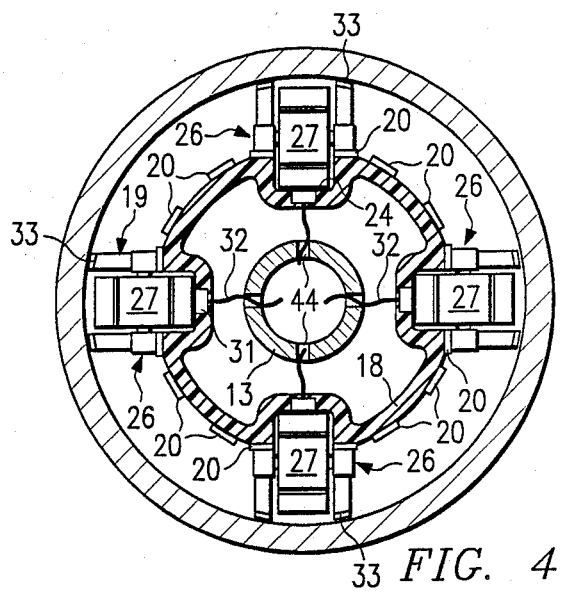
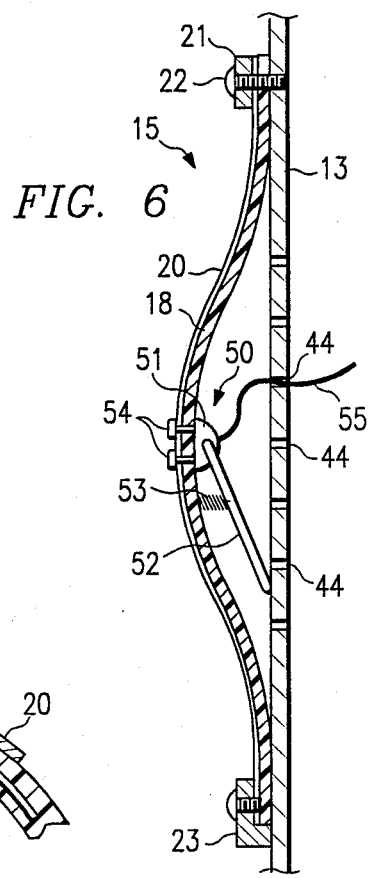
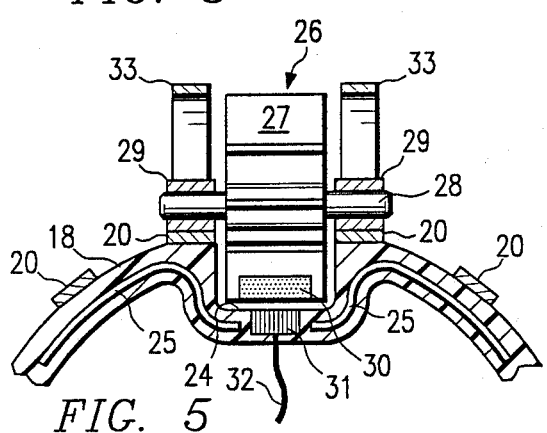
FIG. 3
FIG. 4
FIG. 5
FIG. 6

DOWNHOLE WELLBORE FLOWMETER TOOL

1. TECHNICAL FIELD

The present invention relates to a downhole wellbore flowmeter tool and in one of its preferred aspects relates to a flowmeter tool which is lowered into a wellbore and expanded to measure fluid flow through a restrictive passage around the tool.

2. BACKGROUND ART

Surface measurements of the flow from a well have generally proved inadequate to effectively evaluate the downhole production and/or injection flow profiles of that well. To obtain the more accurate measurements needed for these profiles, several different types of tools have been developed which can be lowered into the wellbore for making measurements of certain downhole flow parameters, e.g. velocities, at various depths in the well. Two of the better known of these tools are the "continuous spinner flowmeter" and the "diverting or basket flowmeter". For a good general description of these types of flowmeters, see "A New Flowmeter for Production Logging and Well Testing", G. E. Piers et al, SPE 16819, 62nd Annual Tech Conf. of Society of Petroleum Engineers, Dallas, TX, Sept. 27–30, 1987 and "Production Logging-The Key to Optimum Well Performance", R. T. Wade et al, JOURNAL OF PETROLEUM TECHNOLOGY, Feb., 1965, pps.137–164.

In both types of flowmeters mentioned above, the flow velocity is determined from the rate of rotation of a propeller-type impeller (spinner) which is positioned in and powered by the flow stream. In the continuous spinner flowmeter (both conventional and full-bore), the impeller or spinner is situated at the lower end of the logging tool where it is exposed directly to the full flow stream. Inhomogeneities in the flow patterns for multi-phase flow, especially in wells deviated more than about 8°, render data from a continuous spinner flowmeter extremely difficult if not impossible to interpret even though such conditions are common. For example, in two-phase flow in a deviated well, downflow often occurs along the lower portion of the well, even though the net flow of both phases is up. Under these conditions, a spinner positioned along the lower side of the wellbore, or sometimes even if centered, may indicate flow in a direction opposite to that which is actually occurring.

Diverting flowmeters of the packer or basket types are designed to alleviate the problems encountered by the continuous spinner flowmeters by channeling the flow to an impeller which is positioned within the housing of the logging tool. At the higher flow velocities resulting from the diversion of the entire wellbore flow through a relatively small passage in the tool housing, severe flow inhomogeneities do not develop as readily and the revolutions (RPMs) of the impeller are a far superior indication of total flow velocity.

Unfortunately, however, diverting flowmeters suffer two significant limitations. Unlike the continuous spinner flowmeters, diverting flowmeters must be stationary in the wellbore while a reading or measurement is made. Thus, flow readings are obtained only at discrete depths in the well, making the precise location of fluid entries or exits more difficult to resolve within a reasonable logging time span, as compared to the results from a continuous logging measurement. In addition, diverting flowmeters are limited as to the maximum flow rate that may be measured. At high flow rates, the pressure drop associated with the flow of the wellbore fluid through the narrow passage in the housing of the logging tool is sufficient to force the tool from its desired vertical position within the well. For example, the basket flowmeter normally can not be used in wells having flows greater than about 3500 barrels per day.

From the above, it can be seen that a need exists for a wellbore flowmeter which can operate in a continuous mode in wells having high flow rates as does the present continuous spinner flowmeters while at the same time, achieving an accuracy comparable to that of a diverting-type flowmeter.

DISCLOSURE OF THE INVENTION

The present invention provides a downhole flowmeter tool which is capable of measuring multi-phase flow velocities in deviated and horizontal wells as well as vertical wells. Unlike many present wellbore flowmeters which provide only point flow measurements for low flow rates, the present tool provides a continuous measurement over the entire range of practical flow rates which are normally expected to be encountered in a typical logging operation. In addition, the tool can be operated to provide data as to downhole flow inhomogeneities which can be useful in the interpretation of data from other types of production logging tools.

More specifically, the present downhole wellbore flowmeter tool is comprised of a housing having an expansible means, e.g., an inflatable packer or sleeve, mounted thereon which, when expanded, forms an annulus around the tool between the outer periphery of the expanded sleeve and the wall of the wellbore. This annulus provides a restrictive flow passage around the tool. A plurality of flow sensing means, e.g., four, are spaced radially around the tool and are moved outwardly with the sleeve as it expands so that the sensors are always positioned within the annulus.

To protect the expansible sleeve and to provide a stable mounting structure for the flow sensing means, a support structure, e.g., a cage formed of resilient spring-steel members, is mounted on the tool over the sleeve and which expands and contracts therewith. Preferably, each flow sensing means is of the paddle-wheel sensor type, rotatably mounted on the support means and including a magnetic element which is detected by a detector unit within the sleeve to thereby measure the rotational speed of the wheel as it is rotated by flow through the restricted passage. Spacers are also mounted on the support means adjacent each paddle wheel sensor and are adapted to engage the wall of the wellbore as the sleeve is expanded to limit radial expansion of both the support means and the sleeve. The spacers insures that there is always a flow annulus around the sleeve and also prevents the paddle-wheels from contacting the wall of the wellbore thereby rendering them inoperable.

By expanding the sleeve to substantially restrict the flow of fluid around the tool, flow in the wellbore produces desirable flow patterns associated with high flow velocities while maintaining the flow velocities low enough to avoid excessive pressure drops across the tool which could otherwise dislodge the tool during operation.

BRIEF DESCRIPTION OF THE DRAWINGS

The actual construction, operation, and apparent advantages of the present invention will be better understood by referring to the drawings in which like numerals identify like parts and in which:

FIG. 3 is an enlarged sectional view of the downhole flowmeter tool taken along line 3—3 of FIG. 2;

FIG. 4 is a sectional view taken along line 4—4 of FIG. 3:

FIG. 5 is an enlarged view of a portion or the tool of FIG. 4; and

FIG. 6 is a sectional view of the downhole flowmeter tool including an expansion indicator transducer.

BEST MODE FOR CARRYING OUT THE INVENTION

Figure 1:
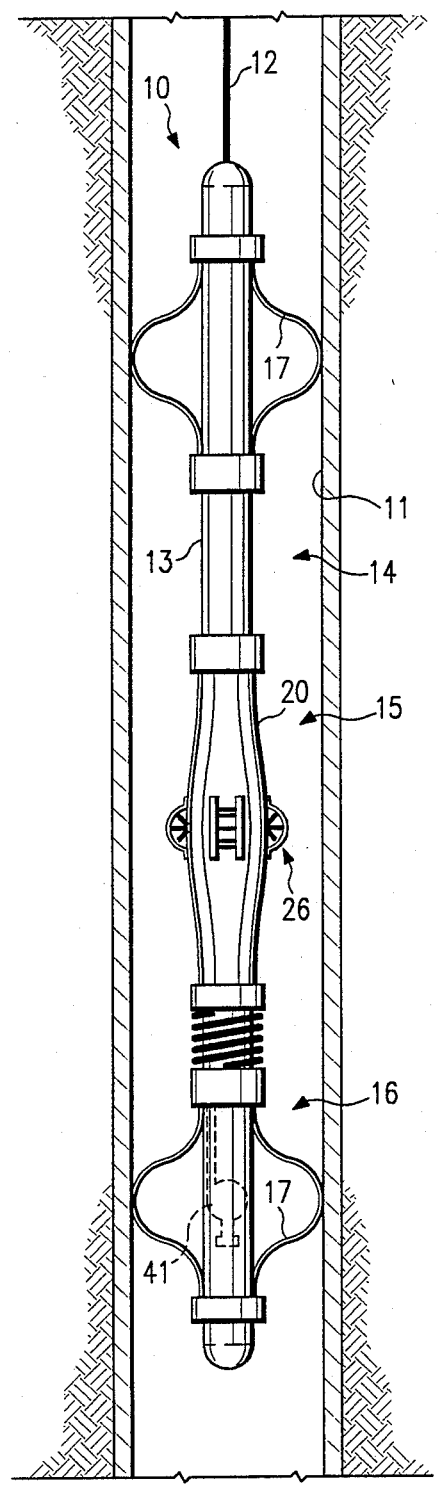
FIG. 1 is a perspective, partly in section, of the present downhole flowmeter tool in a retracted position within a wellbore.
Figure 2:
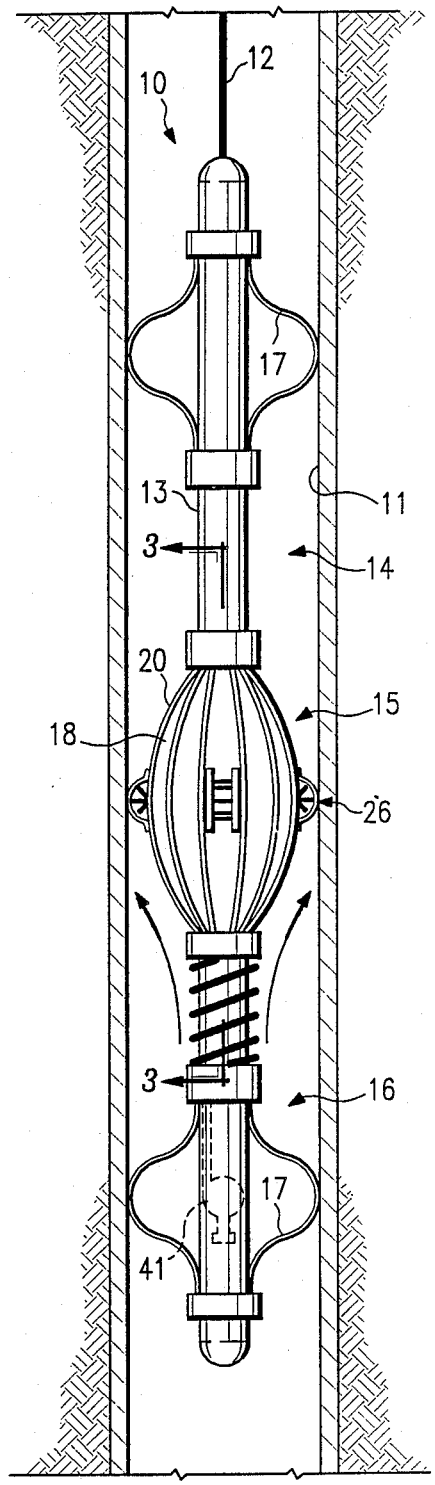
FIG. 2 is the downhole flowmeter tool of FIG. 1 in an expanded position within the wellbore.

Referring more particularly to the drawings, FIG. 1 illustrates a downhole wellbore flowmeter tool 10 in acordance with the present invention as it is lowered in its collapsed or retracted position within cased wellbore 11 of a flowing well. Tool 10, as illustrated in FIGS. 1 and 2, is adapted to be lowered and operated by a "wireline" 12 (e.g., an armored logging cable) and is comprised of a housing 13 which contains an electronic section 14, a flow-sensing section 15, and a pump section 16. Centralizers 17 are mounted along housing 13 to center tool 10 within wellbore 11 as will be understood in the art.

Referring now to FIGS. 3–5, flow-sensing section 15 is comprised of an expansible means 18 which is mounted on housing 13 and is expansible between its collapsed or retracted position (FIG. 1) and its expanded position (FIG. 2). Expansible means 18, as shown is comprised of a flexible or pliable sleeve (e.g., rubber packer) which is bonded to or otherwise positioned within support structure or cage 19 which, in turn, is comprised of a plurality of support members 20 (e.g., resilient flexible spring-steel slats). Members 20 are connected together at their upper ends by collar 21 which also serves to fix the upper end of sleeve 18 to housing 13 via bolts 22 or the like. The lower ends of members 20 and the lower end of sleeve 18 are secured to collar 23 which, in turn, is slidably mounted on housing 13. Sleeve 18 has a plurality of recesses 24 molded or otherwise provided therein; four are shown in FIG. 4 which are radially spaced 90° from each other. Preferably, sleeve 18 has one or more reinforcing members 25, e.g., heavy wire or the like, (FIG. 5) embedded therein to provide rigidity and support to recesses 24.

Positioned within each recess 24 is a flow-sensing means 26. As shown means 26 is preferably comprised of a "paddle-wheel" flow sensor 27 which is rotatably mounted on axle 28. Axle 28 is journalled in bearing blocks 29 which, in turn, are affixed to respective adjacent support members 20. As will be understood in the art, paddle-wheel sensors 27 include a magnetic element 30 carried by at least one of the paddles or spokes of the wheel which, in turn, is sensed by magnetic detector unit 31 which is embedded or otherwise positioned within sleeve 20. Whenever flow causes wheel 27 to rotate, detector unit 31 senses element 30 each time it passes and generates a signal indicative of the revolutions per minute of the wheel. This signal is sent to electronic section 14 in tool 10 through leads 32 where it is processed and/or transmitted to the surface through cable 12 for further processing to produce a measurement of flow.

A rigid spacer 33 is affixed to each of those support members 20 which carry a bearing block 29, spacers 33 extends outward beyond the maximum radius of paddlewheel 27 for a purpose described below.

Tool 10 is lowered into wellbore 11 in its collapsed or retracted position (FIG. 1) to a depth at which a flow parameter measurement is to be made. Sleeve 18 is expanded which moves collar 23 upward thereby biasing support members 20 of cage 19 outward with the sleeve. As the sleeve 18 approaches the wall of wellbore 11, spacers 33 contact the casing to insure that the expanded sleeve will not fully close off all flow through the wellbore but instead will insure that an annular passage 40 (FIGS. 3,4) will be maintained between the outer periphery of expanded sleeve 18 and the wall of the wellbore. Also, spacers 33 prevent paddle wheels 27 from contacting the wall of the wellbore and becoming inoperable.

Sleeve 18 can be expanded by any of several known means. For example, in FIGS. 1 and 2 wherein tool 10 is adapted to be run on logging cable 12, pump 41 in pump section 16 is powered by electrical power supplied through cable 12 to pump fluid (either well fluid or fluid from a self-contained reservoir in section 16) to and from sleeve 18 to inflate and deflate, respectively, the sleeve, see "A New Flowmeter for Production Logging and Well Testing", supra, which describes well tools having similar pump sections.

While tool 10 has been described as being lowered and operated on a wire-line, it should be recognized that tool 10 can also be adapted to be lowered and operated on a tubing string, preferably on a commercially-available "coiled tubing". For a more detailed description of how an expansible sleeve or packer on a downhole tool is inflated when ran on a coiled tubing string, see U.S. Pat. No. 4,787,446 and co-pending U. S. Patent Application 07/305,250, filed Feb. 1, 1989, both commonly assigned herewith and both being incorporated hereby by reference.

In operation, tool 10 is normally collapsed as it is lowered to or below a depth at which flow measurements are to be made. Fluid is supplied through ports 44 (FIG. 3) either from the surface or by means of pump section 16 to expand sleeve 18 outward thereby forming annulus 40 which, in turn, provides a cross-sectional area of wellbore 11 which is sufficiently restricted to produce desirable flow patterns associated with high flow velocities but one which keeps the flow velocities low enough to avoid excessive pressure drops across tool 10.

The size of annulus 40 can be varied during a single logging run by varying the degree of inflation of sleeve 18 if varying conditions with the wellbore 11 so dictate.

As sleeve 18 and hence support 19, are expanded, paddle wheel sensors 27 are carried outward by members 20. Sensors 27 are positioned so that they are always within the restricted flow passage regardless of the final size of annulus 40. Spacers 33 will limit the expansion of sleeve 18 and support means 19 in that the spacers will contact the wall of wellbore 11 when sleeve 18 is fully expanded and will prevent any further expansion. A pressure sensor 45 (FIG.3) or the like may be positioned within sleeve 18 to cease the flow of fluid into sleeve 18 when a maximum, predetermined pressure is reached or exceeded. A simple electromechanical transducer 50 (FIG. 6) indicates the degree to which the tool had been expanded, allowing determination of the cross-sectional area to which the flow is confined and can be used in the subsequent conversion of rotational velocity to fluid flow rate in connection with the known diameter of case wellbore 11. As illustrated in FIG. 6, transducer means 50 is comprised of a rotary displacement transducer 51 which is positioned within sleeve 18 and affixed to a member 20 (one which does not support a flow-sensing means 26) by means of bolts 54 or the like which extend through sleeve 18. Transducer 51 is operated by arm 52 which is rotatably mounted on transducer and is biased outward into contact with housing 13 by spring 53. It can be seen that arm 52 will ride up or down as sleeve 18 is expanded or contracted, respectively, to rotate about its pivot through transducer 51 to thereby generate a signal through lead 55 which is indicative of the degree of expansion.

When sleeve 18 is expanded, flow in wellbore 11 passes upward through the restricted passage formed by annulus 40. This flow causes each of the paddle-wheels 27 to rotate with the rate of rotation (RPMs) of each wheel being determined by the respective detector unit 31 which senses magnetic element 30 on wheel 27 each time it passes the detector unit. This rate of rotation is then processed to provide the desired flow parameter, e.g., flow velocity.

The flow measurement made by tool 10 is continuous, and may be made even with the tool in motion, e.g., being raised in wellbore 11. In addition, tool 10 provides a means for assessing the magnitude of any variations in flow velocity around the circumference of wellbore 11, thus identifying inhomogeneous flow regimes which might call for special care in data interpretation.

Further, any differences in the rotational velocities of the plurality of paddle-wheel sensors 27 distributed around the tool circumference will be indicative of inhomogeneities in the flow field which may be corrected by altering the degree of the sleeve expansion or by using an averaging process to analyze the data from the sensors. While the number of flow sensors 27 may vary, four are considered to represent a viable compromise between mechanical complexity and adequate circumferential flow sampling.

When it is desired to retract tool 10, the fluid within sleeve is released or pumped therefrom and the resiliency of support members 20 moves collar 23 downward on housing 13 thereby moving sleeve 18 and cage 19 back to their original collapsed positions. A tension spring 46 or the like can be coupled between collars 23 and 47 which expands as sleeve 18 expands and contracts to aid in moving collar 23 downward on housing 13 when the pressure behind sleeve 18 is released.

What is claimed is:

1. A downhole flowmeter tool adapted to be lowered into a wellbore for measuring a flow parameter, said tool comprising:
    expansible means for forming an annulus between said tool and the wall of the wellbore thereby providing a restrictive flow passage around said tool; and
    means positioned in said annulus for sensing flow through said restrictive flow passage.
2. The downhole flowmeter tool of claim 1 wherein said means for forming said annulus comprises:
    an expansible sleeve mounted on said tool.
3. The downhole flowmeter tool of claim 2 wherein said means for sensing flow comprises:
    a plurality of flow-sensing means radially spaced around said tool, each of which is positioned within said annulus.
4. A downhole flowmeter tool comprising:
    a housing;
    expansible means mounted on said housing for forming a restricted, annular flow passage around said housing; and
    sensing means carried by said housing and moveable outwardly from said housing into said restricted flow passage for sensing flow through said flow passage.
5. The downhole flowmeter tool of claim 4 wherein said expansible means comprises:
    an expansible sleeve mounted on said housing; and
    means for supplying fluid to said sleeve to expand said sleeve radially outward from said housing.
6. The downhole flowmeter tool of claim 5 including:
    expansible support means surrounding said expansible sleeve for supporting said sensing means.
7. The downhole flowmeter tool of claim 6 wherein said sensing means comprises:
    a plurality of flow sensors radially spaced around said tool, each of which is positioned within said annulus.
8. The downhole flowmeter tool of claim 7 including:
    means for mounting said sensing means on said support means whereby said sensing means are positioned in said annulus as said support means are expanded.
9. The downhole flowmeter tool of claim 7 wherein said plurality of flow sensors comprise:
    four separate sensors radially spaced 90° around said tool.
10. The downhole flowmeter tool of claim 9 wherein each of said plurality of flow sensors comprise:
    a paddle wheel adapted to be rotated by flow through said annulus; and
    means for detecting each revolution of said paddle wheel.
11. The downhole flowmeter tool of claim 10 including:
    spacer means mounted on said support means adjacent each of said plurality of flow sensors and adapted to engage the wall of the wellbore to limit radial expansion of said support means.

* * * * *